United States Patent
Al-Marzouki et al.

(10) Patent No.: US 9,791,012 B1
(45) Date of Patent: Oct. 17, 2017

(54) THERMO-SET RESIN COMPOSITION FOR BRAKE PADS, METHOD OF PREPARATION, AND BRAKE PAD ASSEMBLY

(71) Applicant: King Abdulaziz University, Jeddah (SA)

(72) Inventors: Fahad M. Al-Marzouki, Jeddah (SA); Adnan Zahed, Jeddah (SA); Antonio Pizzi, Epinal (FR); Soliman Mahmoud Soliman Abdalla, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 15/134,058

(22) Filed: Apr. 20, 2016

(51) Int. Cl.
*F16D 69/02* (2006.01)
*C08L 99/00* (2006.01)
*F16D 65/092* (2006.01)

(52) U.S. Cl.
CPC ........... *F16D 69/026* (2013.01); *C08L 99/00* (2013.01); *F16D 65/092* (2013.01); *F16D 2200/0043* (2013.01); *F16D 2200/0052* (2013.01); *F16D 2200/0065* (2013.01); *F16D 2200/0086* (2013.01)

(58) Field of Classification Search
CPC ....... F16D 69/026; F16D 65/092; C08L 99/00
See application file for complete search history.

(56) References Cited

U.S. PATENT DOCUMENTS

| | | | |
|---|---|---|---|
| 5,509,511 A | 4/1996 | Kwolek | |
| 5,595,266 A | 1/1997 | Cecere | |
| 6,596,789 B2 * | 7/2003 | Nakamura | B29C 43/006 523/155 |
| 7,204,878 B2 | 4/2007 | Stancliffe | |

(Continued)

FOREIGN PATENT DOCUMENTS

| | | |
|---|---|---|
| GB | 548137 | 9/1942 |
| JP | 2004291182 A * | 10/2004 |
| JP | 2010-164169 | 7/2010 |

(Continued)

OTHER PUBLICATIONS

Mutlu, I., et al. "Preparation and characterization of brake linings from modified tannin-phenol formaldehyde resin and asbestos-free fillers." Journal of materials science 40.11 (2005): 3003-3005.*

(Continued)

*Primary Examiner* — Nicholas Hill
(74) *Attorney, Agent, or Firm* — Oblon, McClelland, Maier & Neustadt, L.L.P.

(57) ABSTRACT

A thermo-set resin composition comprising a Quebracho wood tannin extract, a furfuryl alcohol, a neoprene compound, a dimethicone, polyethylene glycol, abrasive particles, and a glycerol phosphate acidic ester and/or graphite. Further, a method of preparing the thermo-set resin composition including mixing Quebracho wood tannin extract with a furfuryl alcohol to form a primary mixture, adding additives and abrasive particles to the primary mixture, and reacting the primary mixture by adding a catalyst. The (Continued)

thermo-set resin composition is molded into a shape under heat and pressure to a Brinell hardness 8.5 daN/mm² and 48 daN/mm² and can be incorporated into a friction pad of a brake pad.

19 Claims, 7 Drawing Sheets

(56) References Cited

U.S. PATENT DOCUMENTS

| | | | |
|---|---|---|---|
| 7,407,543 B2 * | 8/2008 | Stancliffe | B22C 1/2293 106/287.2 |
| 2013/0289191 A1 * | 10/2013 | Williamson | C09D 161/12 524/442 |

FOREIGN PATENT DOCUMENTS

| | | |
|---|---|---|
| WO | 2007/124400 A2 | 11/2007 |
| WO | 2011/070332 A1 | 6/2011 |

OTHER PUBLICATIONS

Tondi, G., and A. Pizzi. "Tannin-based rigid foams: Characterization and modification." Industrial crops and Products 29.2 (2009): 356-363.*

Tsai, Ming-Yi, and Shi-Xing Jian. "Development of a micro-graphite impregnated grinding wheel." International Journal of Machine Tools and Manufacture 56 (2012): 94-101.*

Lacoste, Clément, et al. "Pine tannin-based rigid foams: mechanical and thermal properties." Industrial Crops and Products 43 (2013): 245-250.*

XIAMETER® OFX-0193 Fluid, Form No. 95-923-01, Dow Corning, Dated Aug. 1, 2013, three pages.*

Lagel, M. C., J. Zhang, and A. Pizzi. "Cutting and grinding wheels for angle grinders with a bioresin matrix." Industrial Crops and Products 67 (2015): 264-269.*

Zhang, Jun, et al. "Preparation and Characterization of Grinding Wheels Based on a Bioresin Matrix and Glass Sand Abrasives.". BioResources 10.3 (2015): 5369-5380.*

Lagel, M. C., et al. "Automotive brake pads made with a bioresin matrix." Industrial Crops and Products 85 (2016): 372-381.*

Machine translation of Japanese-language patent document JP2004291182 and SciFinder Scholar synopsis of the patent document; machine translation performed on Dec. 19, 2016, with the EPO translation tool.*

Mutlu, I., et al., "Preparation and characterization of brake linings from modified tannin-phenol formaldehyde resin and asbestos-free fillers", Journal of Materials Science, vol. 40(11), Total 1 Page, (2005).

* cited by examiner

THERMO-SET RESIN COMPOSITION FOR BRAKE PADS, METHOD OF PREPARATION, AND BRAKE PAD ASSEMBLY

BACKGROUND OF THE INVENTION

Technical Field

The present invention relates to a thermo-set resin composition commonly employed in brake pads, wherein the thermo-set resin composition comprises one or more plant-based extracts.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

During the last decades a continuous increase of oil prices has occurred. As a result, considerable research has been done to develop new bio-based materials. It is possible to replace petrochemicals with bio-sourced chemicals in a variety of industrial sectors. Natural and renewable materials coming from agriculture or forestry such as furfuryl alcohol and condensed polyflavonoid tannins have been used to develop new biobased materials: biobased adhesive resins insulation foams and floral foams, high tech paper laminates, biobased composites, and finally polyurethanes even without using isocyanates. See Pizzi, A., 1983. "Tannin based wood adhesives," Chapter 4 in Wood Adhesives: Chemistry and technology, Marcel Dekker, New York, Pizzi, A., 1989. Wood Adhesives: Chemistry and Technology, Deeker, New York, Pizzi, A., 1994. Advanced wood adhesives technology, Dekker, New York, Zhou, X., Pizzi, A., Sauget, A., Nicollin, A., Li, X., Celzard, A., Pasch, H., Rode, K., 2013. "Lightweight tannin foam/composites sandwich panels and the coldset tannin adhesive to assemble them," Ind. Crops Prod. 43, 255-260, Tondi, G., Pizzi, A., Olives, R., 2008. "Natural tannin-based rigid foams as insulation for doors and wall panels," Maderas: Ciencia y Tecnologia. 10, 219-227, Tondi, G., Zhao, W., Pizzi, A., Du, G., Fierro, V., Celzard, A., 2009a. "Tannin-based rigid foams: a survey of chemical and physical properties," Bioresource Technology. 100, 5162-5169, Tondi, G., Oo, C. W., Pizzi, A., Trosa, A., Thevenon, M. F., 2009b. "Metal adsorption of tannin based rigid foams," Ind. Crops Prod. 29, 336-340. Basso, M. C., Giovando, S., Pizzi, A., Lagel, M. C., Celzard, A., 2014. "Alkaline tannin rigid foams," J. Renew. Mat. 2, 182-185. Basso, M. C., Pizzi, A., Lacoste, C., Delmotte, L., Al-Marzouki, F. A., Abdalla, S., Celzard, A., 2014. "MALDI-ToF and 13C NMR Analysis of Tannin-Furanic-Polyurethane foams adapted for industrial continuous lines application," Polymers. 6, 2985-3004. Lacoste, C., Basso, M. C., Pizzi, A., Laborie, M. P., Garcia, D., Celzard A., 2013. "Bioresourced pine tannin/furanic foams with glyoxal and glutaraldehyde," Ind. Crops Prod. 45, 401-405. Lagel, M. C., Martinez de Yuso, A., Pizzi, A., Celzard, C., Fierro, V., 2014. "Development and characterization of Quebracho tannins based foams," Matériaux & Techniques. 102, 104, Lagel, M. C., Pizzi, A., Basso, M. C., Abdalla. S., 2014. "Development and characterization of abrasive grinding wheels with a tannin-furanic resins matrix," Ind. Crops Prod. In press. Abdullah, U. H., Pizzi, A., Rode, K., Delmotte, L., Zhou, X., Mansouri, H. R., 2013. "Mimosa tannin resins for impregnated paper overlays" Eur. J. Wood Wood Prod. 71, 153-162. Abdullah, U. H., Pizzi, Zhou, X., 2014. "High pressure paper laminates from mimosa tannin resin," Int. Wood Prod. J. 5, 224-227. Sauget, A., Zhou, X., Pizzi, A., 2014. "Tannin-Resorcinol-Formaldehyde Resin and Flax Fiber Biocomposites," J. Renew. Mat. 2, 1-9, Pizzi, A., 1979a. "Tannin-based polyurethane adhesives," J. Appl. Polymer Sci. 23, 1889-1990, Pizzi, A., 1979b. "Tannin-polyurethane adhesives for bonding aluminium," J. Appl. Polymer Sci. 24, 1579-1581. Thebault, M., Pizzi, A., Dumarcay, S., Gerardin, P., Fredon, E., Delmotte, L., 2014. "Polyurethanes from hydrolysable tannins obtained without using isocyanates," Ind. Crops & Prod. 59, 329-336, Thebault, M., Pizzi, A., Essawy, H., Baroum, A., Van Assche, G., 2015. "Isocyanate free condensed tannin-based polyurethanes," European Polym. J. 67, 513-526, incorporated herein by reference in their entirety. More recently new thermoset plastics based on a natural tannin-furanic thermo-set resin were developed. See Li, X., Nicollin, A., Pizzi, A., Zhou, X., Sauget, A., Delmotte, L., 2013. "Natural tannin-furanic thermosetting moulding plastics," RSC Adv. 3, 17732-17740, incorporated herein by reference in their entirety. These resins are based on the condensation reaction of furfuryl alcohol and tannins. They were developed to replace industrial oil-derived resins.

In view of the forgoing, one objective of the present invention is to provide a thermo-set resin composition, a method of preparing the thermo-set resin composition, and a brake pad assembly including the thermo-set resin.

BRIEF SUMMARY OF THE INVENTION

According to a first aspect a thermo-set resin composition comprising a reaction product of a Quebracho wood tannin extract and furfuryl alcohol, a neoprene compound, a dimethicone, a polyethylene glycol, abrasive particles, wherein the abrasive particles have a grain size 0.1 mm and 0.5 mm, and a glycerol phosphate acidic ester and/or graphite.

In some formulations, thermo-set resin composition further comprises fiberglass and/or mineral wool.

In some formulations, the Quebracho wood tannin extract is 10%-35% by weight of the total resin composition and the furfuryl alcohol is 10%-30% by weight of the total resin composition.

In some formulations, the Quebracho wood tannin extract comprises at least one compound selected from the group consisting of fisetinidin, robinetinidin, catechin, and gallocatechin.

In some formulations, the Quebracho wood tannin extract comprises at least one compound, which forms a condensation reaction product with a polymer of furfuryl alcohol and/or a monomer of furfuryl alcohol when a catalyst is added, the catalyst being an aromatic sulfonic acid.

In some formulations, the thermo-set resin composition comprises 3%-20% by weight of the polyethylene glycol, 0.05%-1.0% by weight of the dimethicone, 0.5%-10% by weight of neoprene compound, and 20%-70% by weight of the abrasive particles, relative to the total weight of the thermo-set resin composition.

In some formulations, the glycerol phosphate acidic ester and/or graphite are each 0.3%-2% by weight, relative to the total weight of thermo-set resin composition.

According to a second aspect a method of preparing a thermo-set resin composition including mixing Quebracho wood tannin extract with a furfuryl alcohol to form a primary mixture, adding at least one primary additive selected from the group consisting of a polyethylene glycol, a tung oil, a dimethicone, and a neoprene compound to the primary mixture, adding a secondary additive to the primary mixture, the secondary additive selected from the group consisting of a glycerol phosphate acidic ester and/or a graphite, adding abrasive particles to the primary mixture, reacting the Quebracho wood tannin extract with the furfuryl alcohol by adding a catalyst to the primary mixture to cure the primary mixture and form the thermo-set resin composition, wherein the thermo-set resin composition is molded into a shape under heat and pressure during the reacting to a Brinell hardness 8.5 daN/mm$^2$ and 48 daN/mm$^2$.

In some formulations, the method further includes adding fiberglass and/or mineral wool into the primary mixture after the adding of the abrasive particles to the primary mixture.

In some formulations, the Quebracho wood tannin extract comprises at least one compound selected from the group consisting of fisetinidin, robinetinidin, catechin, and gallocatechin, wherein the compound forms a condensation reaction product with a polymer of furfuryl alcohol and/or a monomer of furfuryl alcohol.

In some formulations of the method, 10%-35% by weight of the Quebracho wood tannin extract and 10%-30% by weight of the furfuryl alcohol is added to form the primary mixture, relative to the total weight of thermo-set resin composition.

In some formulations of the method, 5%-10% by weight of the polyethylene glycol is added to the primary mixture, 2%-4% by weight of the tung oil is added to the primary mixture, 0.07%-0.14% by weight of the dimethicone is added to the primary mixture, and 7%-2% by weight of neoprene compound is added to the primary mixture, and 20%-70% by weight of the abrasive particles is added to the primary mixture relative to the total weight of the thermo-set resin composition.

In some formulations of the method, no more than 2% by weight of the glycerol phosphatidic acid is added to the primary mixture and/or no more than 2% by weight of the graphite is added to the primary mixture, relative to the total weight of the thermo-set resin composition.

In some formulations of the method, the catalyst is an aromatic sulfonic acid in a glycol solution, the aromatic sulfonic acid in the glycol solution is 65% v/v ratio and is added to the primary mixture at 0.3%-0.7% by weight relative to the total weight of the thermo-set resin composition.

According to a third aspect, s brake pad assembly having a brake plate and a friction pad adhered to a front face of the brake plate, the friction pad includes at least two layers, wherein each layer comprises a friction lining and a fiberglass material, wherein the friction lining comprises a thermo-set resin composition, comprising a condensation reaction product of a Quebracho wood tannin extract and furfuryl alcohol, abrasive particles, a dimethicone, polyethylene glycol, and a neoprene compound.

In some embodiments of the brake pad assembly, the fiberglass material is a base of each of the two layers and the fiberglass material is a final layer of the friction pad.

In some embodiments of the brake pad assembly, the thermo-set resin composition further comprises a tung oil and/or a polyethylene glycol.

In some embodiments of the brake pad assembly, the condensation reaction product of Quebracho wood tannin extract and furfuryl alcohol comprises at least one compound selected from the group consisting of fisetinidin, robinetinidin, catechin, and gallocatechin, in a reacted form with a polymer of furfuryl alcohol and/or a monomer of furfuryl alcohol.

In some embodiments of the brake pad assembly, the thermo-set resin composition further comprises fiberglass and/or mineral wool.

In some embodiments of the brake pad assembly, thermo-set resin composition further comprises glycerol phosphate acidic ester and/or graphite.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

A brake pad assembly includes a brake plate and a friction pad adhered to a front face of the brake plate. The friction pad can vary widely in its composition to enhance performance attributes including efficiency of stopping a moving vehicle, resistance to cracking, and heat dissipation during braking.

The friction pad includes a friction lining which may be made of fibrous materials such as steel, cellulose, ceramic fibers, nylon fibers, polyester fibers, polyethylene, polyvinyl alcohol fibers, or aramid fibers for reinforcement; abrasive particles such as magnesium oxide or zirconium oxide, ferric oxide, and metal powders such as iron powders, copper dusts, aluminum powders and steel powders; anti-wear materials such as graphite, petroleum coke, antimony trisulfite, sulfur, molybdenum disulfide, calcium fluoride, and mixtures thereof; fillers such as barium sulfate, whiting, mica, seacoal, wallestonite, alumina, silicon carbide, kyanite, clay, silicas, brass chips, copper powder, zinc, iron powder, aluminum, and rubber particles; and resin binders such as phenolic resins and various modified phenolic resins as for example, phenolic resins in which the hydroxyl group has been derivatized as for example, with a crosslinkable moiety such as cyanate, epoxy and/or alkyl groups to hold all of the above ingredients together and to form a useful friction pad after molding and curing at high temperatures and pressures. High temperature resistant resins which do not generate volatiles during curing such as cyanated phenolics and phenolic-triazine resin may also be included as resin binders. The resin binder is an important component. The limits of heat resistance and strength of the frictional material are governed largely by the heat resistance and strength of the resin binder.

The present disclosure is an approach to reduce and eliminate hazardous components in brake pads, such as phenolic resins, that may adversely affect humans and the environment. Since the ban of asbestos, which was used in brake pad preparation, research has aimed to further replace formaldehyde, which was reacted with phenol to prepare phenol-formaldehyde resins, with biologically compatible ingredients and bio-sourced materials in the preparation of friction pads for brake pad assemblies.

Referring now to the drawings, wherein like reference numerals designate identical or corresponding parts throughout the several views.

The present disclosure relates to a thermo-set resin composition, a method of making a thermo-set resin composition, and a brake assembly which includes the thermo-set resin composition. To further describe the thermo-set resin composition, a thermo-setting resin is a monomer mixture in a soft solid or viscous state that changes irreversibly into a polymer network by curing, which is then referred to as a thermo-set resin. Curing may be induced by the action of heat, suitable radiation, or both. The thermo-set resin composition of the present disclosure is preferably prepared by mixing a Quebracho wood tannin extract, a furfuryl alcohol, a neoprene compound, a dimethicone, polyethylene glycol, abrasive particles, and a glycerol phosphate acidic ester and/or graphite, then cured. Throughout the present disclosure the thermo-set resin composition is referred to as the thermo-setting resin composition prior to curing.

Quebracho wood tannin is extracted from quebracho wood, for example by boiling quebracho wood to form a quebracho extract which may be optionally further extracted to provide water soluble tannin compounds, which may be prepared into powders or as liquids. The thermo-setting resin composition may include powder and/or liquid of Quebracho wood tannin extract. In some formulations of the thermo-set resin composition, carbohydrates from the Quebracho wood tannin may be extracted with the wood tannin in a trace amount. The carbohydrates may include, but are not limited to cellulose, hemicellulose, and hydrolysis products of cellulose and hemicellulose including, glucose, xylose, mannose, galactose, rhamnose, and arabinose. The thermo-setting resin composition may contain trace amounts of the carbohydrates, relative to the total weight of the thermo-set resin composition, from 0.1%-10%, from 0.5%-8%, from 1%-5%, and from 2%-4%. Furfuryl alcohol may be derived from biological compound such as Burley tobacco, bread, cocoa, coffee, juniper berry oil, barley, and corn sugars through the process of pyrolysis that is heat-activated. The heat-activated pyrolysis process may occur through processes including but not limited to burning, boiling, or roasting.

The Quebracho wood tannin extract may be present in the thermo-setting resin composition at an amount of 10%-35% by weight, 15%-30% by weight, or 20%-30% by weight, relative to the total weight of the thermo-setting resin composition. The furfuryl alcohol may be present in the thermo-setting resin composition at an amount of 10%-30% by weight, 15%-25% by weight, or 18%-22% by weight, relative to the total weight of the thermo-setting resin composition.

Figure 1:
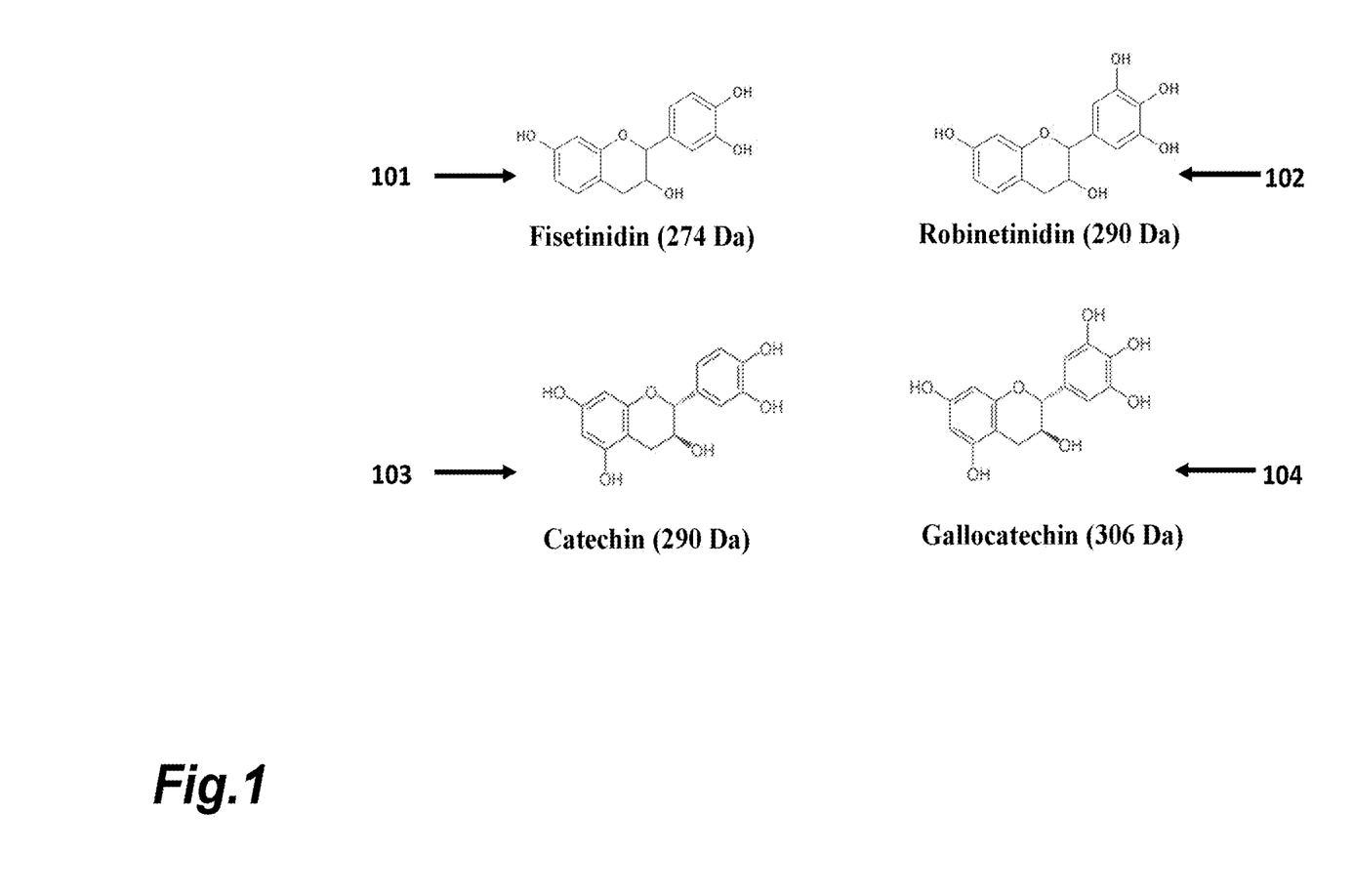
FIG. 1 is chemical structures of compounds that may be found in Quebracho wood tannin extract.

FIG. 1 depicts compounds that may be found in Quebracho wood tannin extract.

Compounds which may be present in the thermo-set resin composition include fisetinidin 101, robinetinidin 102, catechin 103, and gallocatechin 104. In some formulations of the thermo-setting resin, the compounds may form a condensation reaction product with a polymer of furfuryl alcohol and/or a monomer of furfuryl alcohol when reacted therewith in the presence of a catalyst during the curing. The catalyst may be an aromatic sulfonic acid, such as 2,4-dinitrobenzenesulfonic acid, 2,4,5-trichlorobenzenesulfonic acid, para-toluenesulfonic acid, 5-sulfosalicylic acid, or 1,5-naphthalenedisulfonic acid.

Figure 2:
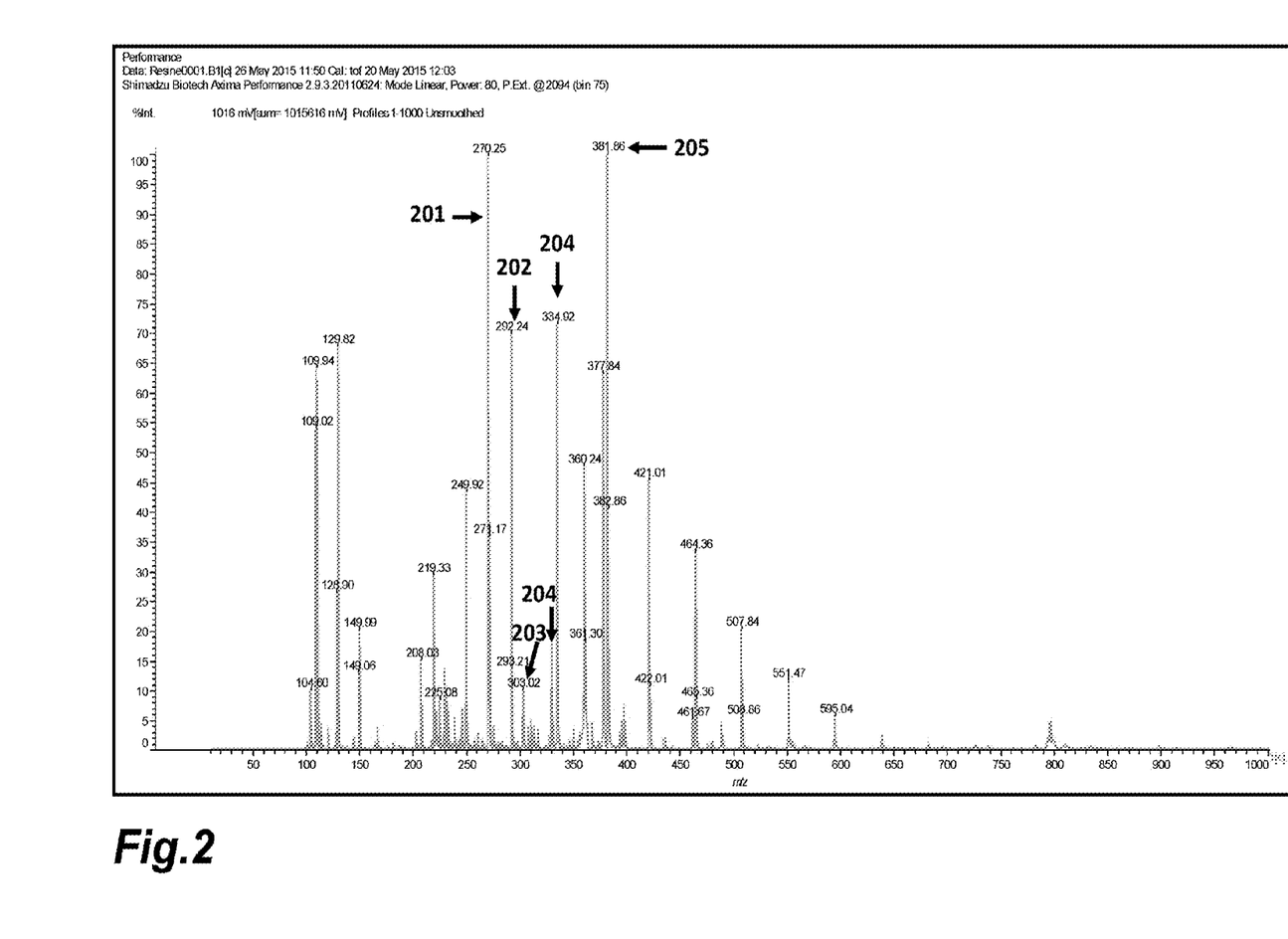
FIG. 2 is a mass spectrogram of compounds that may be found in Quebracho wood tannin extract and condensation reaction products of the compounds and furfuryl alcohol.

FIG. 2 depicts a MALDI-Mass spectrometry spectrogram of several compounds that may be present in the thermo-set resin composition. Deprotonated fisetinidin (101) 201 is observed at the 270 m/z peak. Protonated robinetinidin 102 and catechin 103 are present at the 292 m/z peak 202. Deprotonated gallocatechin 104 is observed by the presence of a peak at 303 m/z 203. Highly protonated and sodium salt adducts of gallocatechin are observed by the presence of peaks at 330 m/z and 334 m/z 204. At peak 381 m/z 205 a gallocatechin-furfuryl alcohol condensation product is observed. Deprotonated fisetinidin 101 present in the thermo-set resin composition, relative to the total weight of the thermo-set resin composition, may be present in an amount from 0%-90%, from 5%-85%, from 10%-75%, from 20%-60%, or from 30%-50%. Protonated robinetinidin may be present in the thermo-set resin composition, relative to the total weight of the thermo-set resin composition, in an amount from 0%-90%, from 5%-85%, from 10%-75%, from 20%-60%, or from 30%-50%. Deprotonated catechin may be present in the thermo-set resin composition, relative to the total weight of the thermo-set resin composition, in an amount from 0%-90%, from 5%-85%, from 10%-75%, from 20%-60%, or from 30%-50%. Deprotonated gallocatechin may be present in the thermo-set resin composition, relative to the total weight of the thermo-set resin composition, in an amount from 0%-90%, from 5%-85%, from 10%-75%, from 20%-60%, or from 30%-50%. The highly protonated gallocatechin may be present in the thermo-set resin composition, relative to the total weight of the thermo-set resin composition, in an amount from 0%-90%, from 5%-85%, from 10%-75%, from 20%-60%, or from 30%-50%. The gallocatechin-furfuryl alcohol condensation product may be present in the thermo-set resin composition, relative to the total weight of the thermo-set resin composition, in an amount from 0%-90%, from 5%-85%, from 10%-75%, from 20%-60%, or from 30%-50%.

The thermo-set composition includes polyethylene glycol (PEG). PEG is categorized as low molecular weight, medium molecular weight, or high molecular weight based on the average molecular weight in grams/mole of component oligomers and polymers of ethylene oxide. For example, PEG formulations names "PEG 100" would indicate that the formulation includes polyethylene glycol polymers and/or oligomers of an average molecular weight of 100 grams/mole. PEG included in the thermo-set composition may include, but is not limited to low molecular weight PEG from PEG 10-PEG 1000, medium molecular weight PEG from PEG 1000-PEG 5000, or high molecular weight PEG from PEG 5000-PEG 10000. Combinations of low molecular weight PEG, medium molecular weight PEG or high molecular weight PEG may be included in the thermoset composition. PEG may also be in branched geometry, star geometry or a combination thereof. The polyethylene glycol may comprise 3%-20% by weight, 5%-15% by weight, or 10%-12% by weight, relative to the total weight of the thermo-setting resin composition.

The thermo-set composition includes dimethicone, which is also known as polydimethylsiloxane (PDMS), and belongs to a group of polymeric organosilicon compounds that are commonly referred to as silicones. In some formulations the dimethicone may include, but is not limited to alkyl dimethicone copolyol sulfosuccinates, dimethicone copolyol esters, and halogenated dimethicone copolyols, or combinations thereof. The thermo-setting resin composition may have 0.05%-1% by weight of the dimethicone, 0.15%-0.9% by weight of the dimethicone, 0.25%-0.8% by weight of the dimethicone, 0.35%-0.7% by weight of the dimethicone, and 0.45%-0.6% by weight of the dimethicone, relative to the total weight of the thermo-set resin composition.

The neoprene compound that is included in the thermo-set composition is alternately referred to as a polychloroprene compound. Neoprene compounds may be categorized as synthetic rubbers that are produced by polymerization of chloroprene. Neoprene compounds exhibit good chemical stability and maintain flexibility over a wide temperature range. Neoprene compounds are available as solid rubber or in latex form. The neoprene compound may include, but is not limited to polyester urethane, bromo isobutylene isoprene, polybutadiene, or chloro-isobutylene isoprene. The thermo-setting resin composition may have 0.5%-10% by weight of neoprene compound, 1.0%-9% by weight of neoprene compound, 2%-8% by weight of neoprene compound, 3%-7% by weight of neoprene compound, or 4%-6% by weight of neoprene compound, relative to the total weight of the thermo-setting resin composition.

In some formulations, the thermo-set resin composition may include one or more elastomeric polymers. The elastomeric polymers may include, but are not limited to polyisoprene, ethylene propylene rubber, polyacrylic rubber, fluorosilicone rubber, butyl rubber, nitrile rubber, styrene-butadiene rubber, epichlorohydrin rubber, polyether block amides, chlorosulfonated polyethylene, perfluoroelastomers, or ethylene-vinyl acetate. The elastomeric polymers may be present in the thermo-setting resin composition at a weight percent 0%-10%, 2%-8%, or 4%-6% relative to the total weight of the thermo-setting resin composition.

Materials such as polyethylene glycol, dimethicone, neoprene compounds or elastomeric polymers, in some formulations, may reduce brittleness in the thermo-set resin composition. The reduction in brittleness relative to the thermo-set resin composition without the materials above, may be 1%-90%, 5%-85%, 10%-80%, 15%-75%, 20%-70%, 25%-65%, 30%-60%, 35%-55%, or 40%-50%.

The thermo-set resin composition may also include materials that increase friction. Abrasive particles may be included in the thermo-set resin composition including, but not limited to iron oxide particles, quartz particles, silica particles, ceramic particles, or most preferably aluminum oxide particles. The abrasive particles may have a grain size 0.1 mm and 0.5 mm, 0.15 mm and 0.45 mm, 0.2 mm and 0.4 mm, or 0.25 mm and 0.35 mm. The abrasive particles may be 20%-70% by weight, 25%-65% by weight, 30%-60% by weight, 35%-55% by weight, 40%-50% by weight, relative to the total weight of the thermo-setting resin composition.

The thermo-set resin composition includes at least one of glycerol phosphate acidic ester and graphite. Glycerol phosphate acid ester may improve flame resistance to the thermo-set resin composition, which is particularly important in the usage of the thermo-set composition in a brake pad assembly to dissipate heat during braking action. Glycerol phosphate acid esters, such as glycerol phosphoric acid methyl ester, glycerol phosphoric acid ethyl ester, or glycerol phosphoric acid dimethyl ester, may be incorporated into the thermo-setting resin composition in an amount of 0.3%-1% by weight, 0.5%-0.9% by weight, or 0.7%-0.8% by weight, relative to the total weight of thermo-setting resin composition.

Graphite is a crystalline form of carbon, a semimetal, a native element mineral, and one of the allotropes of carbon. Graphite is the most stable form of carbon under standard conditions. Graphite may modify the friction of the thermo-set resin composition used in a brake pad. The graphite may be added to the thermo-setting resin composition in a variety of forms including, but not limited to a powder, course flakes, fine amorphous flakes, carbon fiber, $C_{60}$ Buckminster Fullerenes, or carbon nanotubes. Graphite may be mixed into the thermo-setting resin 0.3%-2% by weight, 0.5%-1.5% by weight, 0.7%-1.2% by weight, or 0.8%-1.0% by weight, relative to the total weight of thermo-set resin composition.

In some formulations, the thermo-set resin composition may include fiberglass and/or mineral wool incorporated into the thermo-set resin composition. The fiberglass and/or mineral wool may be incorporated by homogenous dispersion in the thermo-set resin by mechanical mixing via agitation by rotation of a paddle, propeller, or metal ribbon, pulsed-air mixing via jet mixer pumps, or by pulsed-liquid mixing via pulsed jet devices. The fiberglass may come in a variety of forms including, but not limited to fiberglass microspheres, chopped fiberglass, or woven fiberglass. Lengths of fiberglass may be 0.5 mm-30 cm, 1 mm-25 cm, 5 mm-20 cm, 1 cm-15 cm, 1.5 cm-12 cm, 3 cm-8 cm, or 5 cm-7 cm. The mineral wool is also known as mineral fiber, mineral cotton, man-made mineral fiber (MMMF), and man-made vitreous fiber (MMVF). The mineral wool may come in a variety of forms including, but not limited to spun fibers of molten mineral, drawn fibers of molten minerals, ceramic fibers or slag fibers. Slag is the glass-like by-product left over after a metal has been separated from its raw ore. The fiberglass and mineral wool that may be incorporated into the resin may be 10%-60% by weight of the total thermo-setting resin composition, 20%-50% by weight of the total thermo-setting resin composition, or 30%-40% by weight of the total thermo-setting resin composition.

The thermo-set resin composition of the present disclosure may further include the fibrous materials, the abrasive particles, the anti-wear materials, the fillers and the resin binders including, but not limited to those described herein. The thermosetting resin composition may contain, based on the total weight of the thermosetting resin composition, the fibrous materials, the abrasive particles, the anti-wear materials, the filler and the resin binders from 0.1%-25%%, from 0.5%-20%, from 1%-15% or from 5%-10%.

Preparing the above described thermo-set resin composition includes mixing Quebracho wood tannin extract with a furfuryl alcohol to form a primary mixture, adding at least one primary additive including the polyethylene glycol, a tung oil, the dimethicone, and the neoprene compound to the primary mixture, adding a secondary additive to the primary mixture, the secondary additive being a glycerol phosphate acidic ester and/or graphite, adding abrasive particles to the primary mixture, and reacting the primary mixture by adding a catalyst. The thermo-set resin composition prepared in the above described method may be molded into a shape under heat exceeding 150° C. and at a pressure of 50 kg/cm²-90 kg/cm², to a Brinell hardness 8.5 daN/mm² and 48 daN/mm², 10 daN/mm² and 40 daN/mm², 20 daN/mm² and 35 daN/mm², or 28 daN/mm² and 30 daN/mm².

The mixing of the Quebracho wood tannin extract with a furfuryl alcohol may include blending and stirring with mechanical the implements in a mixing vessel. The mixing may continue for 5-30 minutes, for 10-20 minutes, or for 15-18 minutes, until the primary mixture is formed in which the Quebracho wood tannin extract is evenly distributed with the furfuryl alcohol in the mixing vessel.

The adding of the at least one primary additive selected from the group consisting of the polyethylene glycol, a tung oil, the dimethicone, and the neoprene compound to the primary mixture, may include pouring or injecting the primary additive into the mixing vessel. The purpose of the primary additive is to reduce brittleness in the cured thermo-set resin composition. The polyethylene glycol, the dimethicone, and the neoprene compounds are as described herein. The tung oil is a drying oil pressed from the nut of the tung tree which can harden on exposure to air. The tung oil may include, but is not limited to linseed oil, safflower oil, poppy oil, and soybean oil, which are related drying oils. In some implementations, the tung oil is present in an amount of 2%-4% by weight, 2.5%-3.5% by weight, 2.8%-3.0% by weight, relative to the total weight of the thermo-setting resin composition.

The secondary additive, the glycerol phosphate acidic ester and/or graphite is may be added to the mixing vessel by pouring as solid or liquid, or injected as a liquid. The glycerol phosphate acidic ester and the graphite are as described herein. The adding of the abrasive particles to the primary mixture and into the mixing vessel may be by pouring. Stirring and mixing, and/or blending is continuous through each of the addition steps described above.

The reacting is accomplished in the primary mixture by adding a catalyst. The catalyst is as described herein. The aromatic sulfonic acid may be added to the mixing vessel and the primary mixture from a solution in ethylene glycol at 20%-70% v/v ratio, 25%-65% v/v ratio, 30%-60% v/v ratio, 35%-55% v/v ratio, or 40%-50% v/v ratio. A weight percent of the aromatic sulfonic acid may be 0.1%-2.0% weight, 0.5%-1.8% weight, 0.75%-1.5% weight, 0.9%-1.2% weight, relative to the total weight of the thermo-setting resin composition. The aromatic sulfonic acid solution may also be prepared in organic solvents such as ethyl acetate, acetone, acetonitrile, dimethyl sulfoxide, diethyl ether, or chloroform.

In some implementations, the method further comprises adding fiberglass, as described herein, and/or mineral wool, as described herein, into the primary mixture after the adding of the abrasive particles to the primary mixture. The above described thermo-set resin composition and method of preparation can be incorporated into a brake pad assembly having a brake plate and a friction pad adhered to a front face of the brake plate. The friction pad includes at least two layers. Each layer of the friction pad includes a friction lining and a fiberglass material. The friction lining includes the thermo-set resin composition as described herein.

The fiberglass material may include various compositions of fiberglass including, but not limited to alkali glass, alkali resistant glass, corrosive resistant glass, low dielectric constant glass, alkali-free and electrically resistive glass, acid-corrosion resistive glass, calcium aluminosilicate glass, magnesium aluminosilicate glass, or combinations thereof. The fiberglass material that is incorporated into the friction pad layers, and prepared from any of the above compositions of fiberglass, may include, but is not limited to sheets of fiberglass roving, mats of chopped fiberglass strands, or woven mats of fiberglass strands. The linear density of the fiberglass material may be 10 g/m²-400 g/m², 50 g/m²-350 g/m², 75 g/m²-300 g/m², 100 g/m²-275 g/m², 150 g/m²-250 g/m², or 175 g/m²-225 g/m².

The friction lining of the friction pad includes the thermo-set resin composition as described herein, but the friction lining may further include fibrous materials, abrasive particles, anti-wear materials, filler and additional resin binders including, but not limited to those described herein, which may be present in the friction pad as additional layers. The friction lining may contain, relative to the total weight of the friction lining, a weight percent of the fibrous materials, the abrasive particles, the anti-wear materials, the filler and the additional resin binders from 1%-30%, from 5%-25%, or from 10%-15%

In some embodiments of the brake pad assembly, the friction pad may be configured to have the fiberglass material as a base of each of the layers in the friction pad and the fiberglass material is a final layer of the friction pad. The friction lining may be applied over the fiberglass material. The friction pad may be assembled in a mold in which the fiberglass material may be at the bottom of the mold and the friction lining may be poured on top of the fiberglass layer. The depth of one layer of the friction lining after curing may be 1 mm-40 mm, 5 mm-35 mm, 10 mm-30 mm, or 15 mm-25 mm.

In some embodiments, two fiberglass materials may be stacked on top of one another as the base of each layer and/or two fiberglass materials may be stacked on top of one another as the final layer.

The friction pad is then adhered to the front face of the brake pad. The friction pad may be configured for a disc brake pad as well as a brake shoe. The brake pad assembly may be configured for commercial automobiles, military vehicles, high performance automobiles, motorcycles, and motor bikes.

The examples below are intended to further illustrate the thermo-set resin composition, method of preparation, and exemplary brake pad assemblies and are not intended to limit the scope of the claims.

EXAMPLE 1

Materials

Quebracho (*Schinopsis lorentzii* and *balansae*) wood tannin extract (Fintan QSTW) powder was supplied by SilvaTeam (San Michele Mondovi, Italy). This tannin extract after water extraction from the wood, undertook a second extraction in ethanol to eliminate the majority of carbohydrates present which generates resins with better performance.

Furfuryl alcohol (98%), polyethylene glycol 400 (PEG 400), ethylene glycol, para-toluene sulfonic acid (pTSA, with a purity of 97.5%) were purchased from Acros Organics, (Geel, Belgium).

Glycerol phosphate acidic ester was synthesized.

Tung oil was purchased from Oleobois, (Vendargues, France).

Xiameter OFX-0193 Fluid (DC 193) was purchased from Dow Corning, (Midland, United States).

Graphite was provided by Condat, (Chasse-sur-Rhône, France).

Liquid neoprene glue was purchased from Würth, (Känzelsau, Germany).

For this work, two different sizes of abrasive particles were used, purchased from Centre des Abrasifs, (Valenciennes, France). Abrasive particles are aluminium trioxide (Al₂O₃): Alu 36 (grain size of 0.4 mm) and Alu 60 (grain size of 0.25 mm).

Roving of fiberglass of 270 g/m² used came from Sinto, (Aubagne, France). Roving of fiberglass are woven fiberglass.

Mineral wool (No 3 very thin) was purchased from Würth, (Künzelsau, Germany).

Commercial automotive brake pads from Brembo, (Curno, Italy) were used as a control.

Resin Synthesis

The Amounts are Given for a Pair of Brake Pads.

Firstly, furfuryl alcohol and quebracho tannins were mixed together during 15 sec. Secondly PEG 400, tung oil, DC 193 and neoprene were added. Thus graphite and glycerol phosphate acid were added for the relevant formulations. After each addition the mixing time is 15 sec.

Finally a 65% ethylene glycol solution of pTSA was added as a catalyst. The proportions are shown in Table 1.

TABLE 1

Automotive brake pads with quebracho tannins resin

| Sample | 1 | 2 | 3 | 4 | 5 | 6 | 7 | 8 | 9 |
|---|---|---|---|---|---|---|---|---|---|
| | Mass (g) | | | | | | | | |
| Percentage | 150% Alu 36 | 150% Alu 60 | 150% Alu 36 | 150% Alu 60 | 150% Alu 36 | 150% Alu 60 | 100% Alu 36 | 75% Alu 36 | 75% Alu 60 |
| Furfuryl alcohol | 36.37 | 36.37 | 36.37 | 36.37 | 36.11 | 36.11 | 44.81 | 51.59 | 51.59 |
| Tannins QSTW | 42.41 | 42.41 | 42.41 | 42.41 | 42.10 | 42.10 | 52.24 | 60.15 | 60.15 |
| PEG 400 | 14.86 | 14.86 | 14.86 | 14.86 | 14.75 | 14.75 | 18.31 | 21.08 | 21.08 |
| Tung oil | 6.09 | 6.09 | 6.09 | 6.09 | 6.05 | 6.05 | 7.50 | 8.64 | 8.64 |
| DC 193 | 0.22 | 0.22 | 0.22 | 0.22 | 0.22 | 0.22 | 0.28 | 0.31 | 0.31 |
| Al₂O₃ | 156 | 156 | 156 | 156 | 156 | 156 | 130 | 111.43 | 111.43 |
| Graphite | / | / | / | / | 0.76 | 0.76 | 1.88 | 1.08 | 1.08 |
| Neoprene | 2.85 | 2.85 | 2.85 | 2.85 | 2.83 | 2.83 | 3.51 | 4.05 | 4.05 |
| Glycerol phosphate acidic ester | / | / | / | / | / | / | / | / | / |
| pTSA (65% in ethylene glycol) | 1.19 | 1.19 | 1.19 | 1.19 | 1.18 | 1.18 | 1.47 | 1.68 | 1.68 |
| Temperature (° C.) | 200 | 200 | 200 | 200 | 200 | 200 | 150 | 150 | 150 |
| Mineral wool (for each pad) | 1 layer in the middle | 1 layer in the middle | 2 layers in the middle | 2 layers in the middle | 1 layer in the middle | 1 layer in the middle | 5 grams cut | 1 layer in the middle | 1 layer in the middle |
| Fiberglass (for each pad) | 1 layer on each side | 1 layer on each side | 1 layer on each side | 1 layer on each side | 2 grams cut | 2 grams cut | 1 layer on each side | 2 grams cut | 2 grams cut |
| Observations | / | Broken after preparation | / | / | / | Broken after preparation | / | Broken after preparation | Broken after preparation |

TABLE 2

Automotive brake pads with quebracho tannins resin (continued trials)

| Sample | 10 | 11 | 12 | 13 | 14 | 15 | 16 | 17 | 18 | 19 |
|---|---|---|---|---|---|---|---|---|---|---|
| | Mass (g) | | | | | | | | | |
| Percentage | 75% Alu 36 | 75% Alu 60 | 50% Alu 36 | 50% Alu 60 | 50% Alu 36 | 50% Alu 60 | 50% Alu 36 | 50% Alu 60 | 50% Alu 36 | 50% Alu 60 |
| Furfuryl alcohol | 51.59 | 51.59 | 60.18 | 60.18 | 59.50 | 59.50 | 60.18 | 60.18 | 59.50 | 59.50 |
| Tannins QSTW | 60.15 | 60.15 | 70.17 | 70.17 | 69.37 | 69.37 | 70.17 | 70.17 | 69.37 | 69.37 |
| PEG 400 | 21.08 | 21.08 | 24.59 | 24.59 | 24.31 | 24.31 | 24.59 | 24.59 | 24.31 | 24.31 |
| Tung oil | 8.64 | 8.64 | 10.08 | 10.08 | 9.96 | 9.96 | 10.08 | 10.08 | 9.97 | 9.97 |
| DC 193 | 0.31 | 0.31 | 0.36 | 0.36 | 0.36 | 0.36 | 0.36 | 0.36 | 0.36 | 0.36 |
| Al₂O₃ | 111.43 | 111.43 | 86.67 | 86.67 | 85.68 | 85.68 | 86.67 | 86.67 | 85.68 | 85.68 |
| Graphite | 1.08 | 1.08 | 1.26 | 1.26 | 1.25 | 1.25 | 1.26 | 1.26 | 1.25 | 1.25 |
| Neoprene | 4.05 | 4.05 | 4.72 | 4.72 | 4.66 | 4.66 | 4.72 | 4.72 | 4.66 | 4.66 |
| Glycerol phosphate acidic ester | / | / | / | / | 2.97 | 2.97 | / | / | 2.97 | 2.97 |
| pTSA (65% in ethylene glycol) | 1.68 | 1.68 | 1.96 | 1.96 | 1.94 | 1.94 | 1.96 | 1.96 | 1.94 | 1.94 |
| Temperature (° C.) | 150 | 150 | 150 | 150 | 150 | 150 | 150 | 150 | 150 | 150 |
| Mineral wool (for each pad) | 5 grams cut | 5 grams cut | 1 layer in the middle | 1 layer in the middle | 1 layer in the middle | 1 layer in the middle | 5 grams cut | 5 grams cut | 5 grams cut | 5 grams cut |
| Fiberglass (for each pad) | 2 grams cut | 2 grams cut | 2 grams cut | 2 grams cut | 2 grams cut | 2 grams cut | 2 grams cut | 2 grams cut | 2 grams cut | 2 grams cut |
| Observations | / | / | / | / | Broken after preparation | Broken after preparation | / | / | / | / |

After mixing all the components, the dough which will become the friction lining is compacted in mold and cooked at high temperatures (160 and 200° C.). During this phase, the rubber binders are cured. Thus the material is definitively stabilized.

In this work some additives, like glycerol phosphate acidic ester were added to the resin.

The amount of abrasive particles was added to the resin and it was well mixed. Samples were done in an aluminum mold whose walls were coated with silicone sheet. Firstly one layer of fiberglass was put in the bottom of the mold, after the half of the abrasive resin was placed. Then, a second layer of fiberglass was placed and above this the second part of abrasive resin. Eventually a third layer of fiberglass was put on the top of that.

Figure 4A:
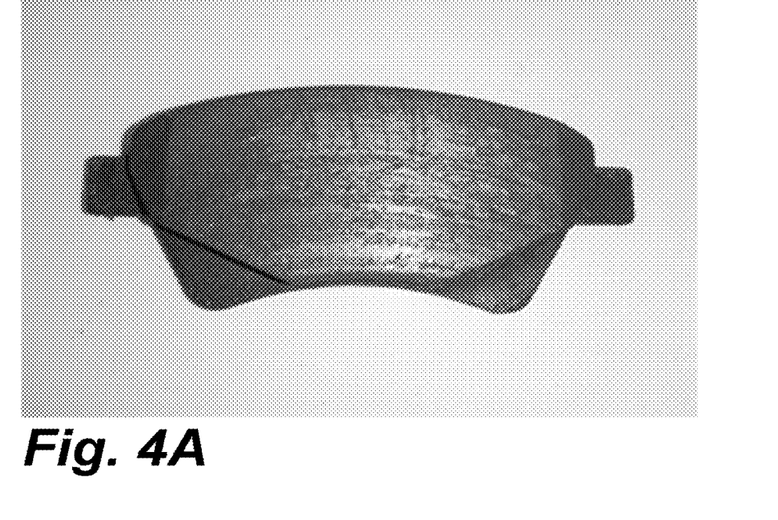
FIG. 4A is a commercial brake pad after braking test.

This resulting composition was put in a hot press during 1 hour at 200° C. (150° C. was also used in order to decrease energy consumption) and with a pressure of 80 kg/cm². Then, samples were cooled and were adhered to metallic plates in order to be identical to the commercial brake pads. These being also composed of a pad bonded onto a metallic plate, so samples could be used like automotive brake pads (FIG. 4A). Concerning the quantity of abrasive particles, three amounts were tested: 150%, 75% and 50% (Table 1 and Table 2). These percentages are linked to the mass of the resin. For example, for a percentage of 150%: if there are 100 g of resin there will be 150 g of particles. Abrasive particles used are aluminium trioxide ($Al_2O_3$): Alu 36 (grain size of 0.4 mm) and Alu 60 (grain size of 0.25 mm).

The fibers were incorporated in two different ways. Indeed, for fiberglass they can be placed on each side of the brake pad, or they can be cut in little (no more than 5 mm length) and mixed with the resin. For mineral wool, it can be placed in the middle of the brake pad or they can be cut in little (no more than 5 mm length) and mixed with the resin.

Automotive Brake Pads and Resin Characterization

Determination of the Emergency Braking Efficiency and Wear Resistance

The emergency braking efficiency of the automotive brake pads developed in this work was determined by testing them with a cycle of ten emergency braking (50 km/h counter until complete standstill of the car). The car was a Renault Scenic I (about 1300 kg).

The braking distance was reported and an average was done. Tests were all done by the same operator. The car was launched to 50 km/h and when the front wheels were at one precise place the operator braked. The braking distance is between this precise place and the location of front wheels when the car is stopped. The comparison with commercial brake pads was done.

In order to characterize wear resistance, the percentages of mass loss and thickness loss were calculated by weighting and measuring the brake pads before and after the emergency braking tests.

Brinell Hardness Test

The tests were done on the basis of NF B 51-126. The tests were done with an Instron 4467 machine. The ball used for the tests had a diameter of 10 mm. The Brinell hardness (daN/mm²) was given by the formula (1).

$$HB = \frac{3.18}{1000} \times \frac{F}{P} \qquad (1)$$

where:
F is the force that determined the retained depression (N),
P is the depth of depression of the ball (mm).

MALDI-TOF Analysis

MALDI-TOF-MS: The spectra were recorded on a SHIMADZU AXIMA Performance MALDI instrument (Manchester, UK). The irradiation source was a pulsed nitrogen laser with a wavelength of 337 nm. The length of one laser pulse was 3 ns. The measurements were carried out using the following conditions: polarity-positive, flight path-linear, mass-high (20 kV acceleration voltage), 1000 pulses per spectrum. The delayed extraction technique was used applying delay times of 200-800 ns.

MALDI-ToF Sample Preparation: The samples were dissolved in acetone:water of 2:1 (5 mg/mL). The sample solutions were mixed with an acetone solution (10 mg/mL acetone) of the matrix. As the matrix 2,5-dihydroxy benzoic acid was used. For the enhancement of ion formation NaCl was added to the matrix (2 μL of NaCl at 0.1M in a mix of methanol:water of 1:1). The solutions of the sample and the matrix were mixed in equal amounts and 1.5 μL of the resulting solution were placed on the MALDI target. After evaporation of the solvent the MALDI target was introduced into the spectrometer.

The formulation of tannins resin was further modified. Indeed in the past the following ameliorations were first done: the use of quebracho tannin instead if mimosa tannin; the addition of plasticizers: a vegetable oil (tung oil) and also silicone oil (DC 193). Tung oil and silicone oil (dimethicone) can improve resilience to cracks and fragility of the resin and increase the rates of curing of the resin. This work was continued by adding neoprene (and others additives like graphite and glycerol phosphate acidic ester) which give to the tannin resin a better resistance and improve its Brinell hardness: the Brinell hardness values obtained were between 6 and 8 daN/mm² for samples made with tannins resin and 150% of abrasive particles).

Emergency Braking Efficiency

Figure 4B:
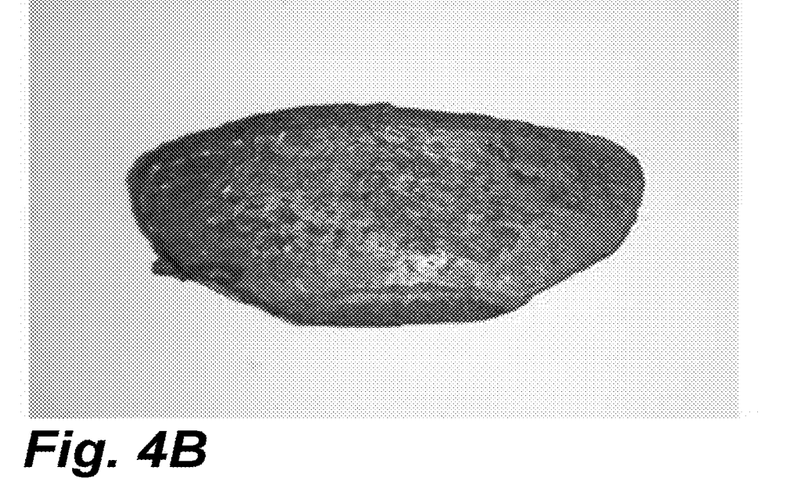
FIG. 4B is a brake prepared with Formulation 3 after braking test.
Figure 4C:
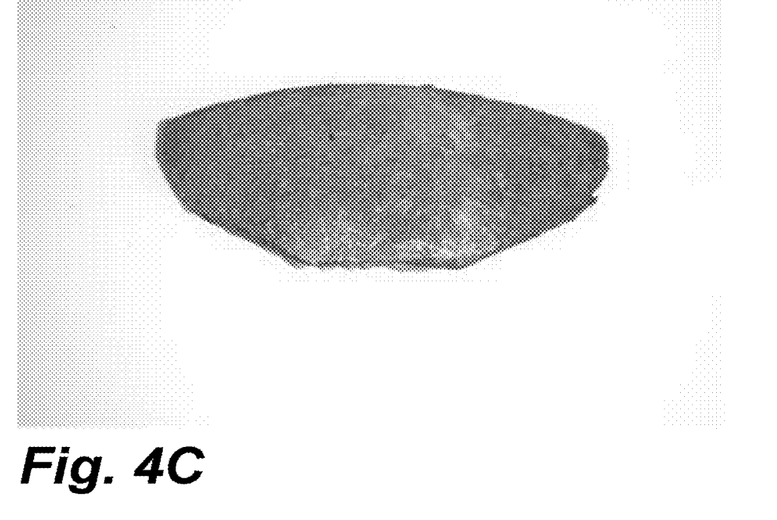
FIG. 4C is a brake prepared with Formulation 5 after braking test.
Figure 4D:
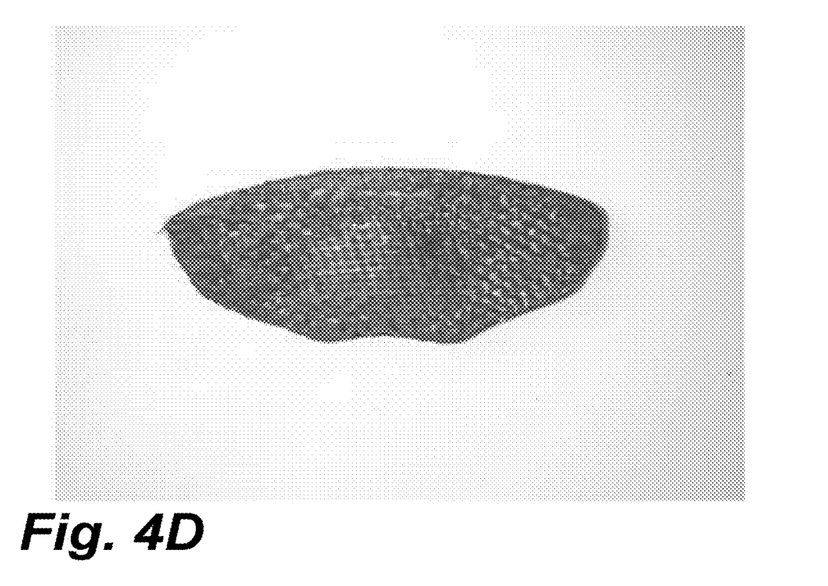
FIG. 4D is a brake prepared with Formulation 7 after braking test.

The experimental automotive brake pads bonded with the biobased resin were compared with commercial brake pads. These latter were used as control (Table 3). All biobased formulations developed in this work lead to better braking distances than commercial brake pads. Concerning formulation with 150% of abrasive particles, the one that has smaller thickness and weight loss is formulation 1 (Alu 36). Formulation 4 in Table 3 (Alu 60, with 2 layers of mineral wool) has also a good wear resistance. Formulation 3 (FIG. 4B), Table 3 is less wear resistant but has a good braking efficiency. Thus, the fact to add 2 layers of mineral wool or fiberglass material in the middle of the brake pad leads to a better bonding pad when Alu 60 is used. This was necessary as the other samples made with 150% Alu 60 but with only one layer of mineral wool break after preparation when they were removed from the mold. When 150% of abrasive particles with fibers from woven fiberglass cut in small pieces (below 5 mm length) are mixed with the resin (Formulation 5, Table 3), the brake pads are less wear resistant (FIG. 4C). Woven fiberglass placed on each side of the sample made with 150% of abrasive particles provided better cohesion of the pad. Brake pads made with 100% of abrasive particles (Formulation 7, Table 3) have also a good wear resistance (FIG. 4D). Thus, by adding to the matrix resin more graphite and choosing an in-between proportion of abrasive, wearing is less but the braking distance is longer.

Figure 4E:
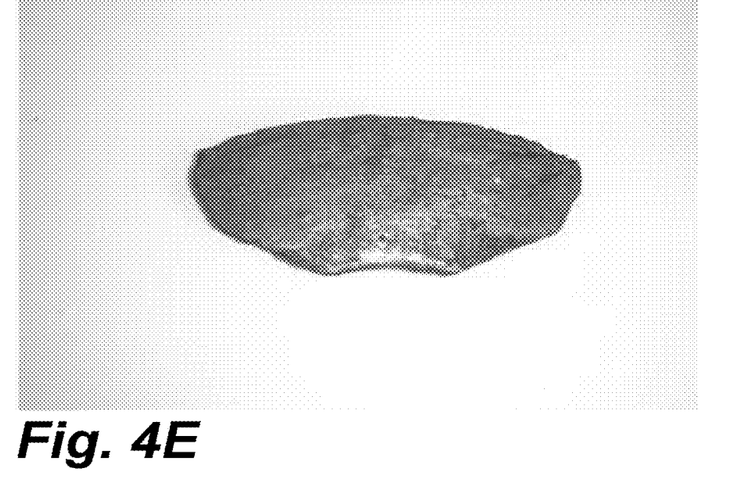
FIG. 4E is a brake prepared with Formulation 11 after braking test.
Figure 4F:
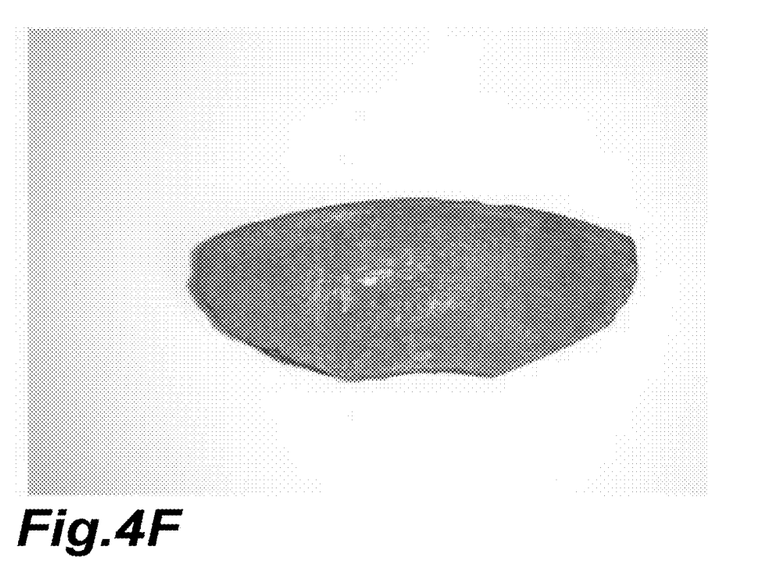
FIG. 4F is a brake prepared with Formulation 12 after braking test.
Figure 4G:
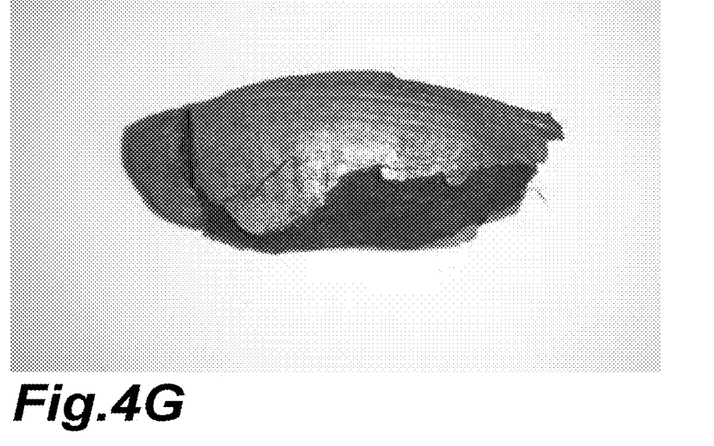
FIG. 4G is a brake prepared with Formulation 13 after braking test.

With an amount of 75% of abrasive particles it is not possible to obtain correct samples with only one layer of mineral wool in the middle because, after preparation, samples were broken in the middle along the layer of mineral wool. Mineral wool has to be cut in small pieces and mixed with the resin in order to have good brake pads (Formulations 10 & 11, Table 3, FIG. 4E). By decreasing the amount of abrasive and by adding cut mineral wool the brake pads are better (FIG. 4F). The best brake pads are those where Alu 60 was used (FIG. 4G). The Alu 60 abrasive particles appear to be more difficult to implement (because with 75% of abrasive particles: mineral wool needs to be cut but with a bigger or even a smaller amount of abrasive, mineral wool can be apply in layer) but have good performance. Moreover, a lower temperature of pressing is still suitable for the pad preparation.

With a smaller amount of abrasive particles (50%) it is possible to obtain correct samples with only one layer of mineral wool in the middle. As there are less particles the resin is less viscous and can better pass between the fibers of mineral wool. Thus, with Alu 36 (Formulation 12, Table 3) these have good wear resistance. But with Alu 60 (Formulation 13, Table 3) they were broken after testing. By decreasing the amount of abrasive particles from 75% to 50%, the braking distance is slightly shorter than with higher proportions of the Alu 36 abrasive, but the wear resistance is almost the same. However, with Alu 60 the behaviour is the opposite: less abrasive leads to more wear and a longer braking distance. The resin to which particles of a smaller size (Alu 60) were added is slightly more liquid than the one with bigger particles size (Alu 36). Thus, this implies that there is more resin without abrasive particles present in the middle of the pad. This leads to a slight heterogeneity of the pad and leads to a longer braking distance and finally to its rupture after removal from the braking rig.

Furthermore, regarding the same formulation with 50% of abrasive particles when cut mineral wool is added to the resin, its braking efficiency is better but the samples are slightly less wear resistant (Formulation 16, Table 3). It could be assumed that this is caused by the better homogeneity of the pad which is obtained in this manner.

Yet when glycerol phosphate acidic ester is added (Formulations 14 & 15, Table 2), the samples broke after preparation. However, when cut mineral wool is added while also adding glycerol phosphate acidic ester (Formulations 18 & 19, Table 3) the pad samples perform reasonably in braking efficiency. As glycerol phosphate acidic ester is a flame retardant it can be assume that it has the effect of retarding the increase in temperature of the pad during braking thus improving their performance.

Figure 4H:
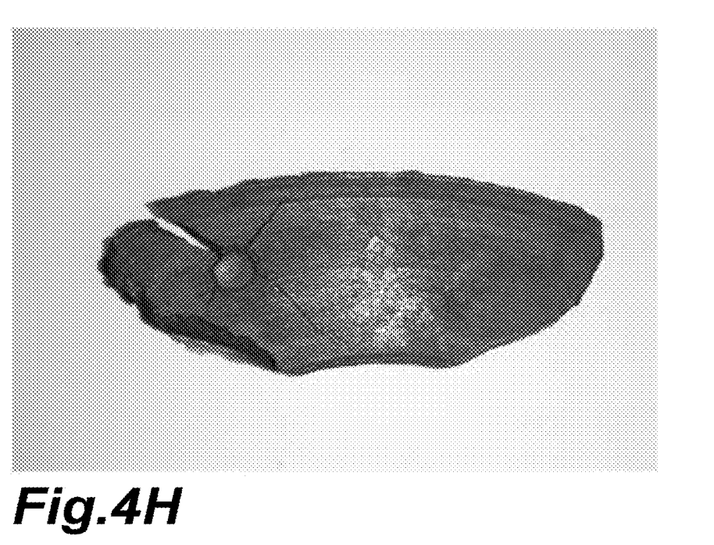
FIG. 4H is a brake prepared with Formulation 13 after Brinell hardness test.

In Table 4 are given the results of the Brinell hardness tests for the biobased automotive brake pads. Of all the biobased automotive brake pads only 3 samples completed the Brinell hardness test without too much cracks or even breaking (FIG. 4H). In all these others cases, the maximum force (N) was reported and an approximate Brinell hardness was calculated. The standard NF B 51-126 recommends applying an increasing force at a rate such that the depth P of 2.5±0.5 mm is reached in 15±5 s and then, maintaining the force corresponding to that depth during 25±5 s.

With the results found in this work it can be say that more abrasive particles do not lead necessarily to a higher Brinell hardness. Thus, the Brinell hardness average for brake pads made with 150%; 100%; 75% and 50% abrasive particles is respectively 3.0; 4.7; 6.2; 2.8 times smaller than that of commercial brake pads. Four out of the six samples prepared with only 50% of abrasive particles have a Brinell hardness only 2 times smaller than commercial brake pad. As a consequence, an optimum level for the proportion of abrasive particles added should be determined for a possible future industrial application.

TABLE 3

Brinell hardness tests of biobased automotive brake pads

| Formulation | Formulation | Brinell hardness (daN/mm$^2$) | Observations |
|---|---|---|---|
| Commercial | Commercial | 70.41 | / |
| 1 | A | 26.55 | Break |
| 3 | B | 24.73 | Break |
| 4 | D | 18.10 | / |
| 5 | E | 26.08 | Break |
| 7 | T | 14.86 | / |
| 10 | P | 15.42 | Break |
| 11 | Q | 9.00 | Break |
| 12 | G | 29.77 | / |
| 13 | H | 19.61 | Break |
| 16 | K | 13.84 | Break |
| 17 | L | 45.12 | Break |
| 18 | R | 29.39 | Break |
| 19 | S | 39.37 | Break |

TABLE 4

Thickness & mass losses and braking distance of biobased automotive brake pads

| Formulation | Average Thickness loss (%) | Average Weight loss (%) | Average Braking distance 50 km/h to stop (m) | Observations |
|---|---|---|---|---|
| Commercial | 1.51 | 0.27 | 8.85 | / |
| 1 | 0.24 | 0.71 | 6.86 | / |
| 3 | 1.40 | 2.67 | 4.92 | / |
| 4 | −0.17 | 1.31 | 6.48 | / |
| 5 | 4.28 | 6.35 | 7.26 | / |
| 7 | 049 | 1.03 | 6.92 | / |
| 10 | 1 72 | 1.59 | 6.63 | / |
| 11 | 0.57 | 0.48 | 6.40 | / |
| 12 | 1.41 | 0.86 | 7.21 | / |
| 13 | 4.71 | 3.51 | 6.79 | Broken after test |
| 16 | 2.14 | 1.44 | 5.48 | / |
| 17 | 4.39 | 3.43 | 7 22 | / |
| 18 | 1.11 | 0.67 | 6.36 | / |
| 19 | 1 59 | 1.32 | 6.40 | / |

Concerning, the fibers used: mineral wool and fiberglass, it appears that if mineral wool is not cut into small pieces it leads to a better Brinell hardness (3 times smaller than commercial brake pads, but when it is cut it is 4 times smaller).

However, the higher values of Brinell hardness obtained for commercial brake pads could also indicate a greater brittleness of these, a really unfavorable characteristics in hard breaking situations. Thus, even if the Brinell hardness of commercial brake pads is about 3 times bigger than that of biobased resin bonded brake pads, industrial tannins resin bonded automotive brake pad show real promise to become competitive with synthetic resin bonded brake pad.

Figure 3:
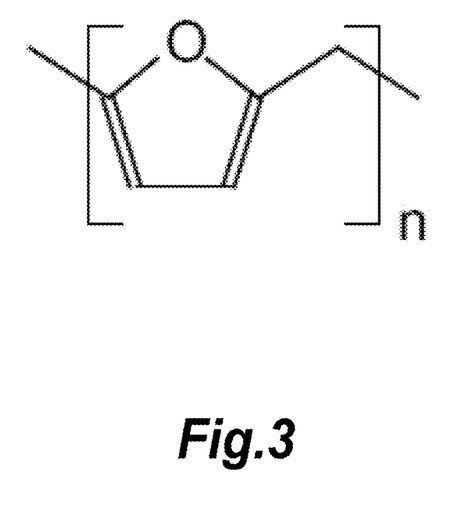
FIG. 3 is a formula for furfuryl alcohol polymers.

The tannin resin was analyzed by MALDI-ToF, this basic resin being composed of: furfuryl alcohol, quebracho tannins QSTW, PEG 400, tung oil, DC 193 and neoprene. By observing the spectrum of the resin obtained by a linear ionization mode analysis, with the ion gate off, a repeating period of 41 Da is evident. In reality it is a repeating period of 82-83 Da (in theory 80 Da), alternating. It is a furfuryl alcohol chain of the repeating unit: -furan-CH2- (FIG. 3).

In Table 5 and FIG. 2 are given the furanic reaction products obtained.

As regard the tannin reaction products, quebracho tannins monomers (FIG. 1) often appear in MALDI in their deprotonated form. Fisetinidin deprotonated which is the predominant unit of quebracho tannins is observed here at 270.25 Da. Protonated robinetinidin and catechin are also present at 292.24 Da. Deprotonated gallocatechin is also present at 303.02 Da and at 330.21 Da and at 334.92 Da but under its highly protonated form but linked also to the Na+ matrix aid.

There is also a major peak at 360.24 Da which is related to gallocatechin-CH2OH, this hydroxymethyl group being derived from the formaldehyde split off by rearrangement of the furane-CH2-O—CH2-furane methylene ether bridgers formed by a side reaction of the furfuryl alcohol.

From 381 Da, there are a series of peaks which are related to reaction between gallocatechin and furfuryl alcohol. They are explained in Table 6.

Gallocatechin is the monomer which is then appearing to predominantly react, as it is the more reactive one. Other monomers can only react afterwards in the formation of the resin. This is one reason why in the MALDI-TOF spectrum reported for the resin only the reaction with furfuryl alcohol of gallocatechin and some catechin appears. Reaction products between furfuryl alcohol and other monomers which are less reactive either appear later in the reaction or indeed do not occur at the stage of the reaction which was used for MALDI-TOF analysis.

TABLE 5

Furanic reactions in MALDI-ToF spectrum of tannins resin analysis

| $M + Na^+$ (exp.) | $M + Na^+$ (calc.) | Molecules (where FA is furanic nuclei) |
|---|---|---|
| 231.0 | 230 | $FA-CH_2-O-CH_2-FA-CH_2OH$ |
| 334.92 | 338 | $FA-CH_2-O-CH_2-FA-O-CH_2-FA$ |
| 491.03 | 492 | $(FA-CH_2)_5-FA$ |
| 641.11 | 643 | $(FA-CH_2-O-CH_2)_5-H_2O-CH_2OH$* and/or |
|  |  | $(FA-CH_2-O-CH_2)_5-FA$** |
| 797.00 | 797 | $HOCH_2-(FACH_2OCH_2FA_4-CH_2OH$ or |
|  |  | $HOCH_2-(FA-CH_2)_8-FA-CH_2OH$ |

*Due to condensation between formaldehyde that has split off from FA—CH$_2$—O—CH$_2$—FA bond to give FA—CH$_2$—FA + HCHO that has reacted again with the hydroxymethyl group of the furfuryl alcohol.
**Due to the same, the HCHO split off but has reacted with the furanic nuclei rather than with the hydroxymethyl group.

TABLE 6

Gallocatechin and furan nuclei reactions in MALDI-ToF spectrum of tannins resin analysis

| $M + Na^+$ (exp., Da) | $M + Na^+$ (calc, Da) | Molecules (where FA is furanic nuclei) | Observations |
|---|---|---|---|
| 381.86 | 386 | Gallocatechin-$CH_2$—FA | Without $Na^+$ |
| 421.01 | 421 | Gallocatechin-$CH_2$—FA | Gallocatechin highly protonated, with $Na^+$ |
| 464.36 or 465.36 | 466 or 469 | Gallocatechin-$CH_2$—FA—$CH_2$—FA or (Gallocatechin-$CH_2$—FA)-$(CH_2OH)_2$ | Without $Na^+$ or with $Na^+$ |
| 551.47 | 549 | (Gallocatechin-$CH_2$—FA—$CH_2$—FA)-$(CH_2OH)_2$ | With $Na^+$ |

The invention claimed is:

1. A thermo-set resin composition, comprising:
  a reaction product of a Quebracho wood tannin extract and furfuryl alcohol;
  0.5%-3% by weight of a neoprene compound, relative to a total weight of the thermo-set resin composition;
  a dimethicone;
  polyethylene glycol;
  abrasive particles, wherein the abrasive particles have a grain size in a range of 0.1 mm and 0.5 mm; and
  a glycerol phosphate acidic ester and/or graphite.

2. The thermo-set composition of claim 1, wherein the glycerol phosphate acidic ester is present.

3. The thermo-set composition of claim 1, wherein the glycerol phosphate acidic ester and the graphite are present.

4. The thermo-set resin composition of claim 1, further comprising fiberglass and/or mineral wool.

5. The thermo-set composition of claim 4, wherein the fiberglass and the mineral wool are present.

6. The thermo-set resin composition of claim 1, wherein the Quebracho wood tannin extract is 10%-35% by weight of the total resin composition and the furfuryl alcohol is 10%-30% by weight of the total resin composition.

7. The thermo-set resin composition of claim 1, wherein the Quebracho wood tannin extract comprises at least one compound selected from the group consisting of fisetinidin, robinetinidin, catechin, and gallocatechin.

8. The thermo-set resin composition of claim 7, wherein the at least one compound forms a condensation reaction product with a polymer of furfuryl alcohol and/or a monomer of furfuryl alcohol when a catalyst is added, the catalyst being an aromatic sulfonic acid.

9. The thermo-set resin composition of claim 1, comprising 3%-20% by weight of the polyethylene glycol, 0.05%-1.0% by weight of the dimethicone, and 20%-70% by weight of the abrasive particles, relative to the total weight of the thermo-set resin composition.

10. The thermo-set resin composition of claim 9, wherein glycerol phosphate acidic ester and/or graphite are each 0.3%-2% by weight, relative to the total weight of thermo-set resin composition.

11. The thermo-set composition of claim 1, which comprises 1%-3% by weight of the neoprene compound.

12. The thermo-set composition of claim 11, which comprises 1%-2% by weight of the neoprene compound.

13. The thermo-set composition of claim 1, wherein the neoprene compound is in a form of a liquid.

14. A brake pad assembly, comprising:
  a brake plate, and
  a friction pad adhered to a front face of the brake plate, the friction pad comprising at least two layers, wherein each layer comprises:
    a friction lining, and
    a fiberglass material, wherein the friction lining comprises a thermo-set resin composition comprising:
      a condensation reaction product of a Quebracho wood tannin extract and furfuryl alcohol,
      abrasive particles,
      a dimethicone,
      polyethylene glycol, and
      a neoprene compound.

15. The brake pad assembly of claim 14, wherein the fiberglass material is a base of each of the at least two layers and the fiberglass material is a final layer of the friction pad.

16. The brake pad assembly of claim 14, wherein the thermo-set resin composition further comprises a tung oil and/or a polyethylene glycol.

17. The brake pad assembly of claim 14, wherein the condensation reaction product of Quebracho wood tannin extract and furfuryl alcohol comprises at least one compound selected from the group consisting of fisetinidin, robinetinidin, catechin, and gallocatechin, in a reacted form with a polymer of furfuryl alcohol and/or a monomer of furfuryl alcohol.

18. The brake pad assembly of claim 14, wherein the thermo-set resin composition further comprises fiberglass and/or mineral wool.

19. The brake pad assembly of claim 14, wherein thermo-set resin composition further comprises a glycerol phosphate acidic ester and/or a graphite.

\* \* \* \* \*